US012711701B2

(12) United States Patent
Onuma

(10) Patent No.: US 12,711,701 B2
(45) Date of Patent: Aug. 18, 2026

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Kazufumi Onuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 18/481,938

(22) Filed: Oct. 5, 2023

(65) Prior Publication Data

US 2024/0119668 A1 Apr. 11, 2024

(30) Foreign Application Priority Data

Oct. 6, 2022 (JP) ................................ 2022-161719

(51) Int. Cl.

*G06T 17/00* (2006.01)
*G06T 7/20* (2017.01)

(Continued)

(52) U.S. Cl.

CPC ................ *G06T 17/00* (2013.01); *G06T 7/20* (2013.01); *G06T 7/70* (2017.01); *G06V 10/25* (2022.01);

(Continued)

(58) Field of Classification Search

CPC . G06T 17/00; G06T 2207/30196; G06T 7/20; G06T 7/246; G06T 7/70;

(Continued)

(56) References Cited

U.S. PATENT DOCUMENTS

2008/0118106 A1* 5/2008 Kilambi ................. G06M 11/00 382/103
2011/0228982 A1* 9/2011 Zhou ....................... G06T 7/277 382/103

(Continued)

FOREIGN PATENT DOCUMENTS

JP 2007219603 A 8/2007
JP 2015103016 A 6/2015

(Continued)

OTHER PUBLICATIONS

Saad M. Khan, et al.,"A Multiview Approach to Tracking People in Crowded Scenes Using a Planar Homography Constraint", May 31, 2026, Topics in Cryptology—The Cryptographers' Track at the RSA Conference 2020, San Francisco, CA, Feb. 24-28, 2020, pp. 133-146, XP047529953.

(Continued)

*Primary Examiner* — Said Broome
*Assistant Examiner* — Andrew Shin
(74) *Attorney, Agent, or Firm* — Canon U.S.A., Inc. IP Division

(57) ABSTRACT

An image processing apparatus includes one or more memories storing instructions, and one or more processors executing the instructions to obtain three-dimensional shape data of at least one object, wherein the three-dimensional shape data is generated using images of the at least one object captured from a plurality of directions by a plurality of image capturing units, extract a plurality of parts of the obtained three-dimensional shape data, assign identifiers to the extracted plurality of parts based on positions of the extracted plurality of parts, and track the extracted plurality of parts based on the identifiers and the positions of the extracted plurality of parts.

16 Claims, 9 Drawing Sheets

(51) Int. Cl.
*G06T 7/70* (2017.01)
*G06V 10/25* (2022.01)
*H04N 13/275* (2018.01)

(52) U.S. Cl.
CPC ....... *H04N 13/275* (2018.05); *G06V 2201/07* (2022.01)

(58) Field of Classification Search
CPC .. H04N 13/117; H04N 13/275; H04N 13/282; G06V 2201/07
See application file for complete search history.

(56) References Cited

U.S. PATENT DOCUMENTS

| | | | | |
|---|---|---|---|---|
| 2015/0120624 | A1* | 4/2015 | Yokono | G06V 10/776<br>706/12 |
| 2016/0162738 | A1* | 6/2016 | Miyano | G06T 7/277<br>348/143 |
| 2021/0049802 | A1* | 2/2021 | Luo | G06T 19/006 |
| 2023/0222821 | A1* | 7/2023 | Delp, III | G06F 18/22<br>382/110 |
| 2023/0326041 | A1* | 10/2023 | Babazaki | G06N 3/0464<br>382/103 |
| 2024/0111297 | A1* | 4/2024 | Masuda | G05D 1/622 |

FOREIGN PATENT DOCUMENTS

| | | | |
|---|---|---|---|
| JP | 2016031673 | A | 3/2016 |
| JP | 2017068650 | A | 4/2017 |
| JP | 2017211828 | A | 11/2017 |
| JP | 2021149513 | A | 9/2021 |
| WO | 2022021217 | A1 | 2/2022 |

OTHER PUBLICATIONS

Matthias Straka, "Human Pose and Shape Estimation From Multi•View Images for Virtual Dressing Rooms", Dissertation, Jan. 1, 2014, Graz, Austria, Internet Retrieval—URL:https://diglib.tugraz.at/download.php?id=576a7d2822561&location=browse, XP055382018.

Fanglu Xie, et al.,"Mixture Particle Filter with Block Jump Biomechanics Constraint for Volleyball Players Lower Body Parts Tracking", 2017 Fifteenth IAPR International Conference on Machine Vision Applications, MVA Organization, May 8, 2017, pp. 302-305, XP033126587.

Roberto Vezzani, et al., "People Reidentification in Surveillance and Forensics: A Survey", ARXIV, ACM, New York, NY, US, vol. 46, No. 2, Dec. 27, 2013, pp. 1-37, XP058036552.

Kong-Man (German) Cheung, et al., "Shape-From-Silhouette Across Time Part II: Applications to Human Modeling and Markerless Motion Tracking", International Journal of Computer Vision, Kluwer Academic Publishers, vol. 63, No. 3, Jul. 1, 2005, pp. 225-245, XP019216472.

Michiro Hirai, et al., "3D Body Part Tracking of a Human in Clothing using Probabalistic Non-linear Time-series Volume Learning", Information Processing Society of Japan, 20080829, vol. 2008, No. 82, pp. 107-114.

* cited by examiner

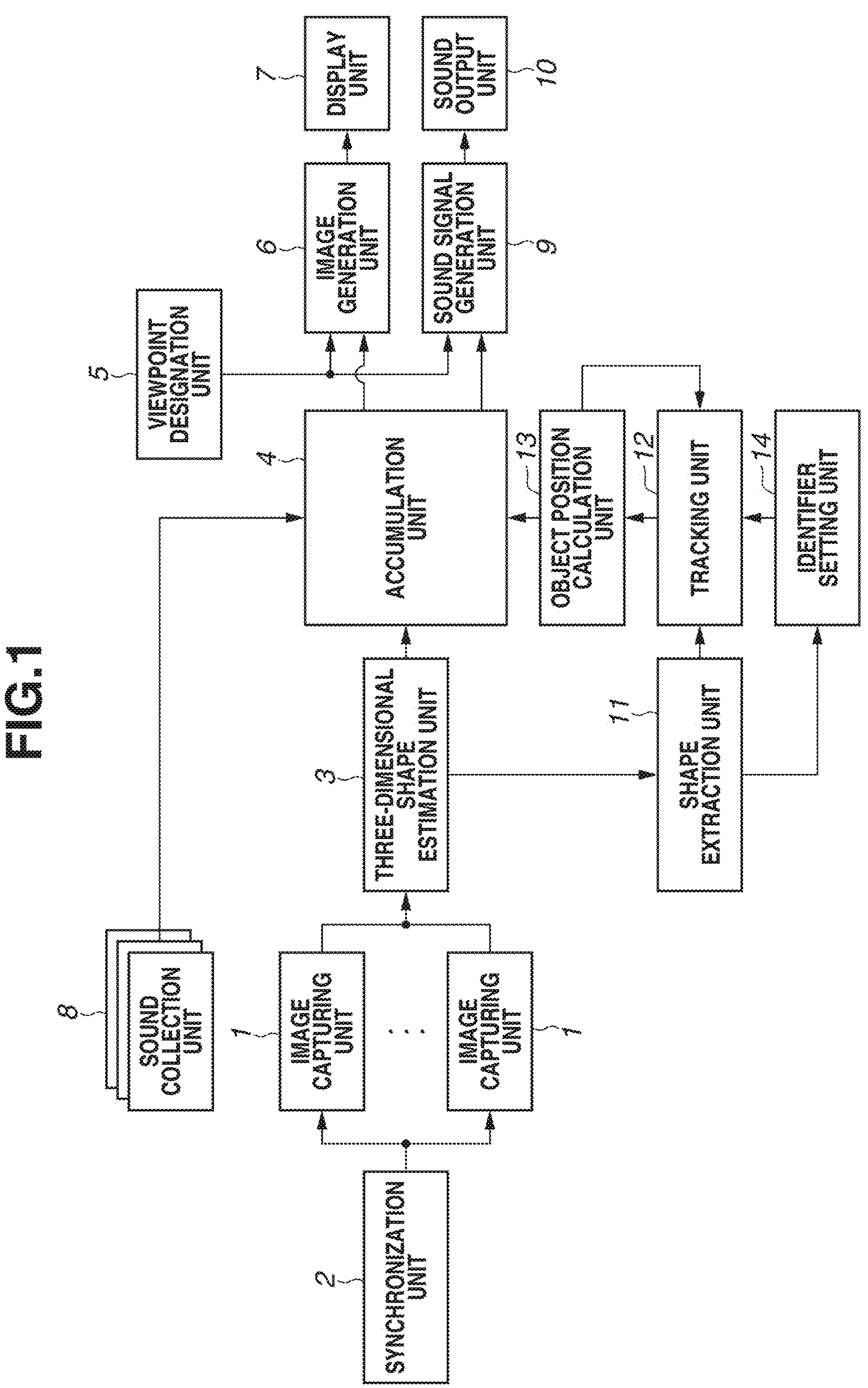
FIG.1
SYNCHRONIZATION UNIT
2
IMAGE CAPTURING UNIT
1
IMAGE CAPTURING UNIT
1
SOUND COLLECTION UNIT
8
THREE-DIMENSIONAL SHAPE ESTIMATION UNIT
3
SHAPE EXTRACTION UNIT
11
ACCUMULATION UNIT
4
OBJECT POSITION CALCULATION UNIT
13
TRACKING UNIT
12
IDENTIFIER SETTING UNIT
14
VIEWPOINT DESIGNATION UNIT
5
IMAGE GENERATION UNIT
6
SOUND SIGNAL GENERATION UNIT
9
DISPLAY UNIT
7
SOUND OUTPUT UNIT
10

IMAGE PROCESSING APPARATUS, METHOD FOR CONTROLLING THE SAME, AND STORAGE MEDIUM

BACKGROUND OF THE INVENTION

Field of the Invention

The present invention relates to an image processing apparatus that generates a virtual viewpoint image, a method for controlling the image processing apparatus, and a storage medium.

Description of the Related Art

There is known a virtual viewpoint image generation system that generates a virtual viewpoint image, which is an image viewed from a virtual viewpoint designated by a user, based on images captured by an image capturing system including a plurality of cameras. Japanese Patent Application Laid-open No. 2017-211828 discusses a system in which images captured by a plurality of cameras are transmitted to an image computing server (an image processing apparatus) and then the image processing apparatus extracts, from the captured images, a region with a large change as a foreground image, and a region with a small change as a background image.

Recently, virtual reality (VR) using, for example, a head mounted display (HMD) has enabled the user to enjoy a viewing experience as if the user is in a virtual space created by three-dimensional computer graphics (3DCG). In the VR, for example, concerts have been held by virtual artists using avatars.

In such a concert, it has been demanded that a concert of a real artist is reproduced in a virtual 3D space, using the virtual viewpoint image described above. In a case where a concert of a real artist is reproduced in a virtual 3D space using the virtual viewpoint image, for example, tracking the position of the artist is necessary in order to synthesize a sound source corresponding to the position of the artist. However, particularly in the case of a plurality of artists, tracking the position of each of the artists may be difficult.

SUMMARY OF THE INVENTION

According to an aspect of the present invention, an image processing apparatus includes one or more memories storing instructions, and one or more processors executing the instructions to obtain three-dimensional shape data of at least one object, wherein the three-dimensional shape data is generated using images of the at least one object captured from a plurality of directions by a plurality of image capturing units, extract a plurality of parts of the obtained three-dimensional shape data, assign identifiers to the extracted plurality of parts based on positions of the extracted plurality of parts, and track the extracted plurality of parts based on the identifiers and the positions of the extracted plurality of parts.

Further features of the present invention will become apparent from the following description of exemplary embodiments with reference to the attached drawings.

BRIEF DESCRIPTION OF THE DRAWINGS

FIG. 1 is a block diagram illustrating an example of an image processing system.

DESCRIPTION OF THE EMBODIMENTS

Figure 2A:
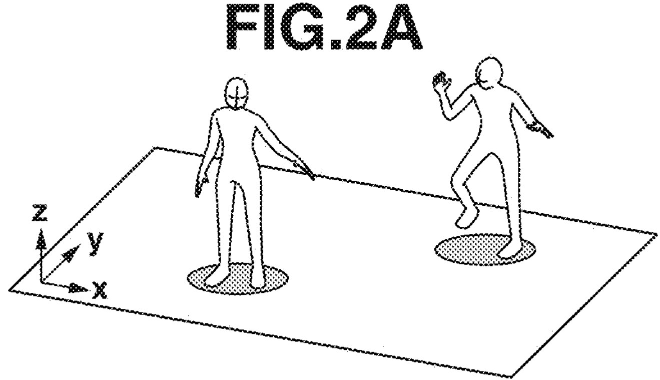
FIGS. 2A, 2B, 2C, 2D, and 2E are diagrams respectively illustrating an example of positions of objects, an example of the objects extracted by a shape extraction unit, another example of the positions of the objects, another example of the objects extracted by the shape extraction unit, and an example of extracted shapes.

<System Configuration and Operation of Image Processing Apparatus>

FIG. 1 illustrates an example of a configuration of an image processing system that generates a virtual viewpoint image according to a first exemplary embodiment of the present invention. For example, the image processing system includes a plurality of image capturing units 1, a synchronization unit 2, a three-dimensional shape estimation unit 3, an accumulation unit 4, a viewpoint designation unit 5, an image generation unit 6, a display unit 7, a sound collection unit 8, a sound signal generation unit 9, a sound output unit 10, a shape extraction unit 11, a tracking unit 12, an object position calculation unit 13, and an identifier setting unit 14. The image processing system may include one image processing apparatus or a plurality of image processing apparatuses. In the following description, a case will be described where the image processing system includes one image processing apparatus.

Operations of components of an image processing apparatus which generates a virtual viewpoint image and to which the image processing system according to the present exemplary embodiment is applied will be schematically described. First, the plurality of image capturing units 1 captures images in synchronization with each other based on a synchronization signal from the synchronization unit 2. The image capturing units 1 output the captured images to the three-dimensional shape estimation unit 3. The image capturing units 1 are arranged around an image capturing region including an object in order to enable capturing the images of the object from a plurality of directions. The three-dimensional shape estimation unit 3 extracts, for example, a silhouette of the object using the input captured images viewed from a plurality of viewpoints, and generates a three-dimensional shape of the object using a volume intersection method or the like. The three-dimensional shape estimation unit 3 outputs the generated three-dimensional shape of the object and the captured images to the accumulation unit 4. In the present exemplary embodiment, the object is a three-dimensional shape generation target, and examples of the object include a person and an article used by a person.

The sound collection unit 8 collects sounds at a plurality of positions in the image capturing region or a sound from each object, and outputs data of the collected sounds to the accumulation unit 4.

The accumulation unit 4 stores and accumulates the following data group as data (material data) used to generate a virtual viewpoint image. More specifically, the data used to generate a virtual viewpoint image includes the captured images and the three-dimensional shape of the object that are input from the three-dimensional shape estimation unit 3. The data used to generate a virtual viewpoint image also includes camera parameters, such as the position, orientation and optical characteristics of each of the image capturing units 1, and the sound data obtained by the sound collection unit 8. In addition, a background model and a background texture image are stored (recorded) in advance in the accumulation unit 4, as data used to generate the background of the virtual viewpoint image.

The viewpoint designation unit 5 includes a viewpoint operation unit that is a physical user interface, such as a joy stick or a jog dial (not illustrated), and a display unit for displaying the virtual viewpoint image.

The virtual viewpoint of the virtual viewpoint image displayed on the display unit can be changed by the viewpoint operation unit.

In response to the change of the virtual viewpoint via the viewpoint operation unit, the virtual viewpoint image is generated as appropriate by the image generation unit 6 (described below) and displayed on the display unit. The viewpoint designation unit 5 may use the display unit 7 (described below) as the display unit, or may include the display unit separately. The viewpoint designation unit 5 generates virtual viewpoint information based on the input from the viewpoint operation unit, and outputs the generated virtual viewpoint information to the image generation unit 6. The virtual viewpoint information includes information corresponding to external camera parameters, such as the position and orientation of the virtual viewpoint, information corresponding to internal camera parameters, such as a focal length and an angle of view, and time information designating an image capturing time of the image to be reproduced.

The image generation unit 6 obtains the material data corresponding to the designated image capturing time from the accumulation unit 4, based on the time information included in the input virtual viewpoint information. The image generation unit 6 generates the virtual viewpoint image based on the set virtual viewpoint, using the captured images and the three-dimensional shape of the object included in the obtained material data, and outputs the generated virtual viewpoint image to the display unit 7.

The display unit 7 displays the image input from the image generation unit 6. The display unit 7 is, for example, a display or a head-mounted display (HMD).

The sound signal generation unit 9 obtains the sound data corresponding to the designated image capturing time from the accumulation unit 4, based on the time information included in the input virtual viewpoint information. The sound signal generation unit 9 arranges, on a three-dimensional space, the obtained sound data as a virtual sound source. The sound signal generation unit 9 generates a sound signal based on the distance in position between the virtual sound source and the virtual viewpoint and the direction of the virtual viewpoint, and outputs the generated sound signal to the sound output unit 10.

The sound output unit 10 includes a speaker, a headphone, or the like, and performs sound output (reproduction) based on the input sound signal.

<Object Position Tracking Method>

A method for tracking an object position according to the present exemplary embodiment will be described.

First, the three-dimensional shape estimation unit 3 generates the three-dimensional shape of each object, and outputs the generated three-dimensional shape to the accumulation unit 4 and also to the shape extraction unit 11.

Figure 2B:
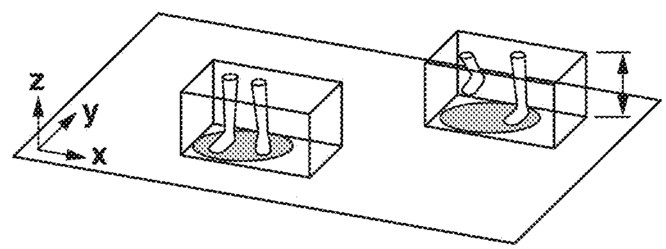
Figure 2C:
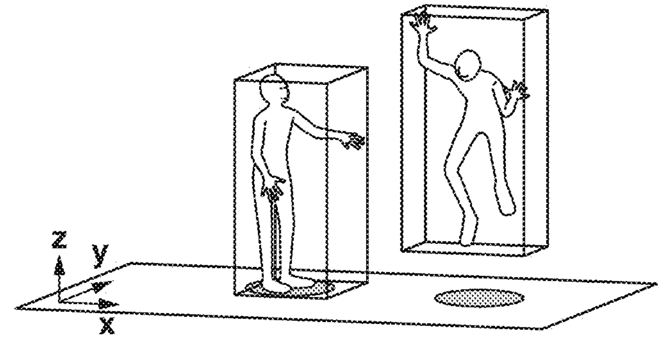
Figure 2D:
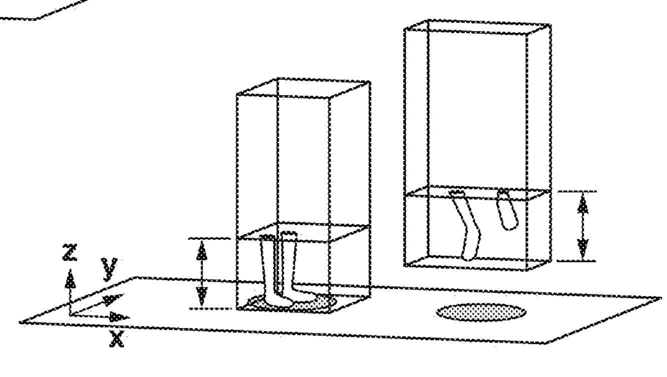

The shape extraction unit 11 clips, from the three-dimensional shape of each object illustrated in FIG. 2A, a lower part of the three-dimensional shape of each object as illustrated in FIG. 2B. In the present exemplary embodiment, the shape extraction unit 11 clips a part of the three-dimensional shape of each object corresponding to a predetermined height (e.g., 50 cm) from a bottom surface of a circumscribed cuboid of the three-dimensional shape. For example, as illustrated in FIG. 2C, in a case where one object is standing on a floor surface, and the other object is, for example, jumping and is apart from the floor surface, parts illustrated in FIG. 2D are clipped from the three-dimensional shapes of the objects. In other words, from the three-dimensional shape of each object, a part corresponding to the predetermined height from the object's feet is clipped.

Figure 2E:
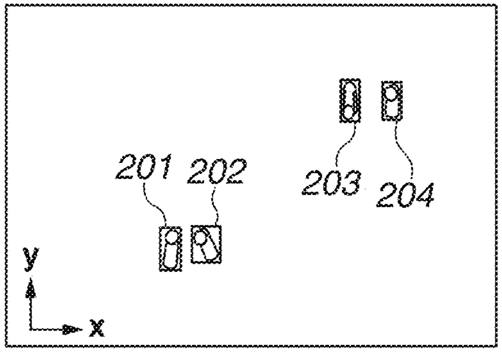

Next, as illustrated in FIG. 2E, the shape extraction unit 11 generates a two-dimensional image by performing plane projection of the clipped parts of the three-dimensional shapes seen from directly above the objects. In the present exemplary embodiment, the shape extraction unit 11 performs parallel projection of the clipped parts of the three-dimensional shapes on a two-dimensional plane corresponding to the feet (the floor surface). In the present exemplary embodiment, the image generated by the plane projection is a binary image including a white portion indicating the clipped parts of the three-dimensional shapes, and a black portion indicating the other area. The shape extraction unit 11 divides the two-dimensional image into independent regions, and determines circumscribed rectangles 201 to 204 as illustrated in FIG. 2E. The shape extraction unit 11 outputs information about vertices of the circumscribed rectangles 201 to 204, as extracted three-dimensional shapes (or extracted shapes). At this time, the shape extraction unit 11 converts the information about the vertices of the circumscribed rectangles 201 to 204 into the same coordinate system and unit as those of the three-dimensional space of the image capturing region, and outputs the resulting information. The shape extraction unit 11 determines the independent shapes using a method, such as a continuous component analysis on the two-dimensional image generated by the projection. By using such a method, the shape extraction unit 11 can divide the three-dimensional shapes into independent regions.

Figure 3A:
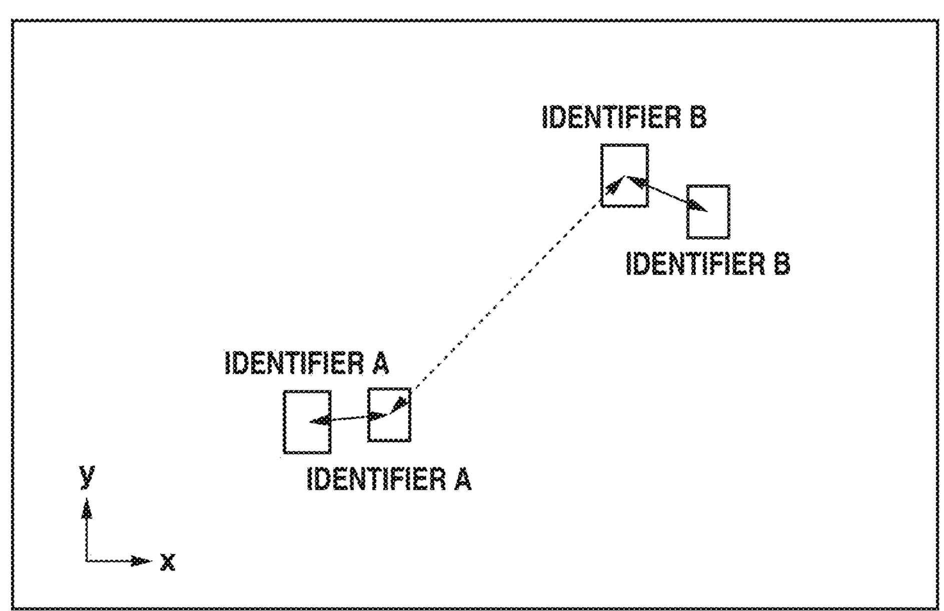
FIGS. 3A and 3B are diagrams respectively illustrating an example of the extracted shapes to which identifiers are assigned, and an example of a graphical user interface (GUI) for displaying the extracted shapes and the identifiers.

The identifier setting unit 14 assigns an identifier to each of the extracted shapes output from the shape extraction unit 11. More specifically, the identifier setting unit 14 calculates distances between the extracted shapes, and assigns an identifier to each of the extracted shapes based on the distances therebetween. For example, as illustrated in FIG. 3A, the identifier setting unit 14 assigns the same identifier to the extracted shapes located at a distance (indicated by each solid line arrow) smaller than a predetermined distance, and assigns different identifiers to the extracted shapes located at the predetermined distance or larger (indicated by a broken line arrow). A threshold for the predetermined distance used as a determination criterion is desirably a distance corresponding to the width between the feet of a standing object. In the present exemplary embodiment, a description will be given of a case where the threshold for the predetermined distance is set to 50 cm.

Figure 3B:
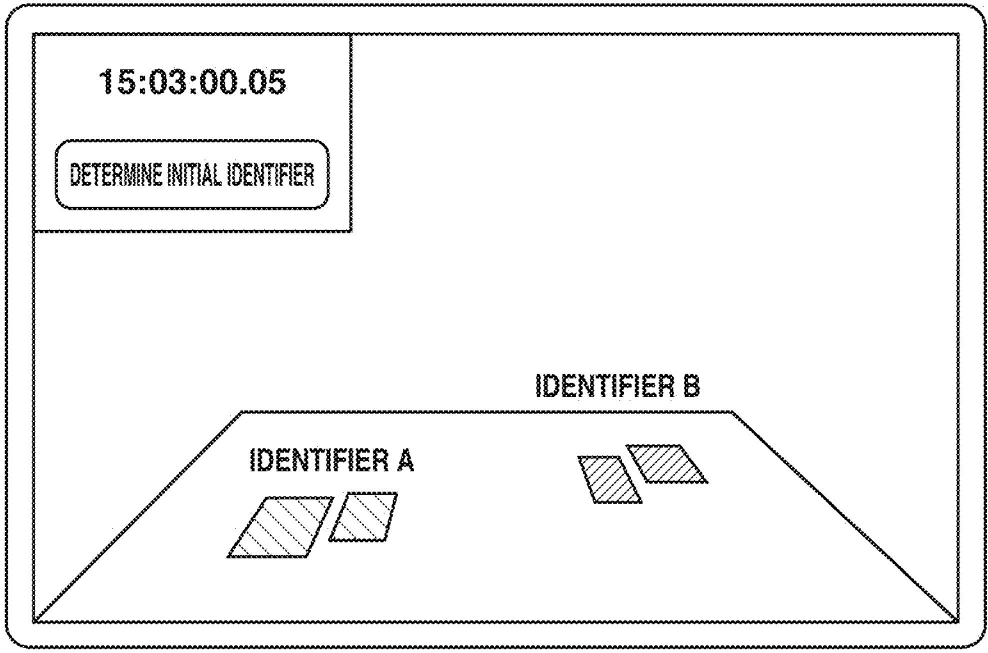

The identifier setting unit 14 displays the assigned identifiers on a display unit of the identifier setting unit 14 by using a graphical user interface (GUI) as illustrated in FIG. 3B. The user operates the image processing system while watching the GUI. More specifically, the identifier setting unit 14 displays the current assignment state (the initial assignment state) of the identifiers on the GUI in a manner distinguishing the identifiers from each other in at least one of text and color. In FIG. 3B, the identifier setting unit 14 displays the identifiers distinguished from each other in both text and color. The user views the GUI to check whether the initial assignment state of the identifiers is a desired assignment state. In a case where the initial assignment state of the identifiers is not a desired assignment state, the user instructs each object to change the standing position or close the feet, and repeats this operation until the desired assignment state is obtained. Alternatively, the user operates the image processing system via the GUI, and provides a change instruction so as to obtain the desired assignment state. In a case where the desired assignment state is obtained, the user presses, for example, a determination button (an initial identifier determination button) on the GUI illustrated in FIG. 3B. In response to this operation, the identifier setting unit 14 determines the initial identifiers. The identifier setting unit 14 then outputs the identifiers assigned to the respective extracted shapes to the tracking unit 12.

The tracking unit 12 assigns the initial identifiers to the respective extracted shapes when the identifiers are input from the identifier setting unit 14. The tracking unit 12 then tracks the extracted shapes with the identifiers assigned thereto. The identifiers to be assigned to the extracted shapes in the tracking are not the identifiers determined by the identifier setting unit 14, but the identifiers determined based on results of tracking the positions of the extracted shapes by the tracking unit 12. In the tracking (the tracking analysis) of the extracted shapes, the tracking unit 12 tracks the extracted shapes based on positions of the extracted shapes at a time immediately preceding the image capturing time of the extracted shapes, the identifiers of the extracted shapes, and object position information input from the object position calculation unit 13 (described below). Tracking processing by the tracking unit 12 will be specifically described below. The tracking unit 12 assigns an identifier to each extracted shape at each time based on the tracking analysis results, and outputs each extracted shape to the object position calculation unit 13.

Figure 4:
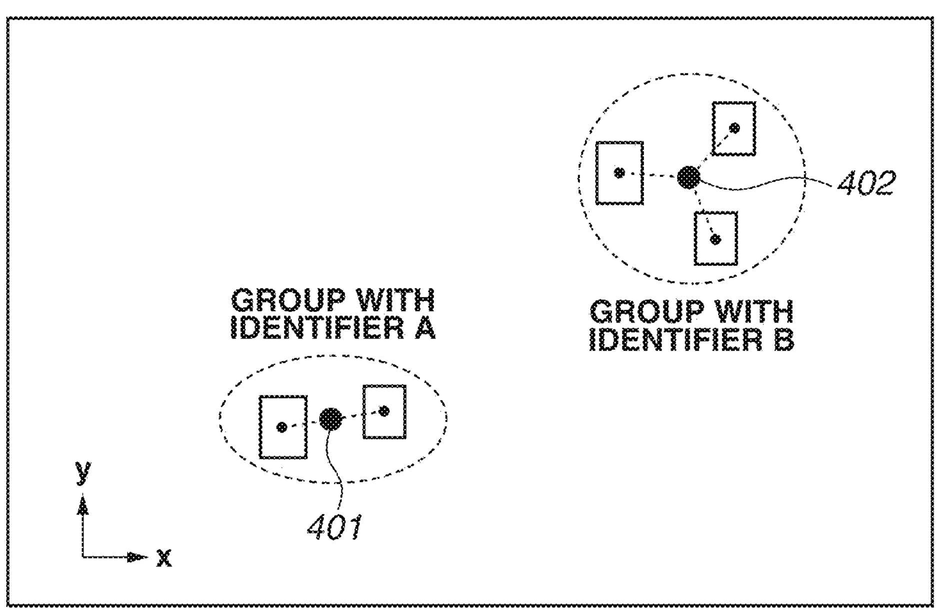
FIG. 4 is a diagram illustrating an example of representative positions.

The object position calculation unit 13 calculates a representative position for each extracted shape with the identifier assigned thereto input from the tracking unit 12. For example, as illustrated in FIG. 4, the object position calculation unit 13 calculates a position indicating each extracted shape group with the same identifier assigned thereto, like representative positions 401 and 402. In the present exemplary embodiment, the representative position is the center position of each extracted shape group.

Even if an object is standing still, the representative position may fluctuate at each time because the representative position is affected by shape estimation errors or fluctuations of the boundary portion occurring when the shape is clipped by the shape extraction unit 11. For this reason, in the present exemplary embodiment, the object position calculation unit 13 performs processing in a temporal direction, such as low-pass filter processing and moving averaging processing, on the center position information at each time, thereby generating the position information with high-frequency components reduced. The object position calculation unit 13 then outputs, as the position of each object, the position information about the representative position together with the identifier to the tracking unit 12. The object position calculation unit 13 also stores (accumulates), in the accumulation unit 4, information obtained by adding the information about the image capturing time of the three-dimensional shapes, which is a basis of the tracking analysis, to the position information about each representative position, as object position information.

The sound signal generation unit 9 obtains, from the accumulation unit 4, the sound data and the object position information that correspond to the designated image capturing time, based on the time information included in the virtual viewpoint information. In the present exemplary embodiment, since the object position information does not include information in the height direction, the sound signal generation unit 9 adds the height information corresponding to each object to the object position information. For example, in the present exemplary embodiment, the sound signal generation unit 9 adds the height information corresponding to a mouth or a musical instrument of each object, to the object position information. The sound signal generation unit 9 then associates, with the object position information, the sound data that is collected by the sound collection unit 8 (e.g., a microphone) and corresponds to the identifier assigned to the object position information including the height information. In this way, the sound signal generation unit 9 can add the position of the virtual sound source for reproducing the associated sound data to each position indicated by the object position information.

With the above-described system configuration, the image processing system can generate stereoscopic sounds based on the viewpoint position of the virtual viewpoint image and the position of each object in the virtual viewpoint image. The virtual viewpoint image generated by the image processing system enables the user to enjoy a more realistic image and sound experience.

<Tracking Analysis Processing by Tracking Unit>

Figure 5:
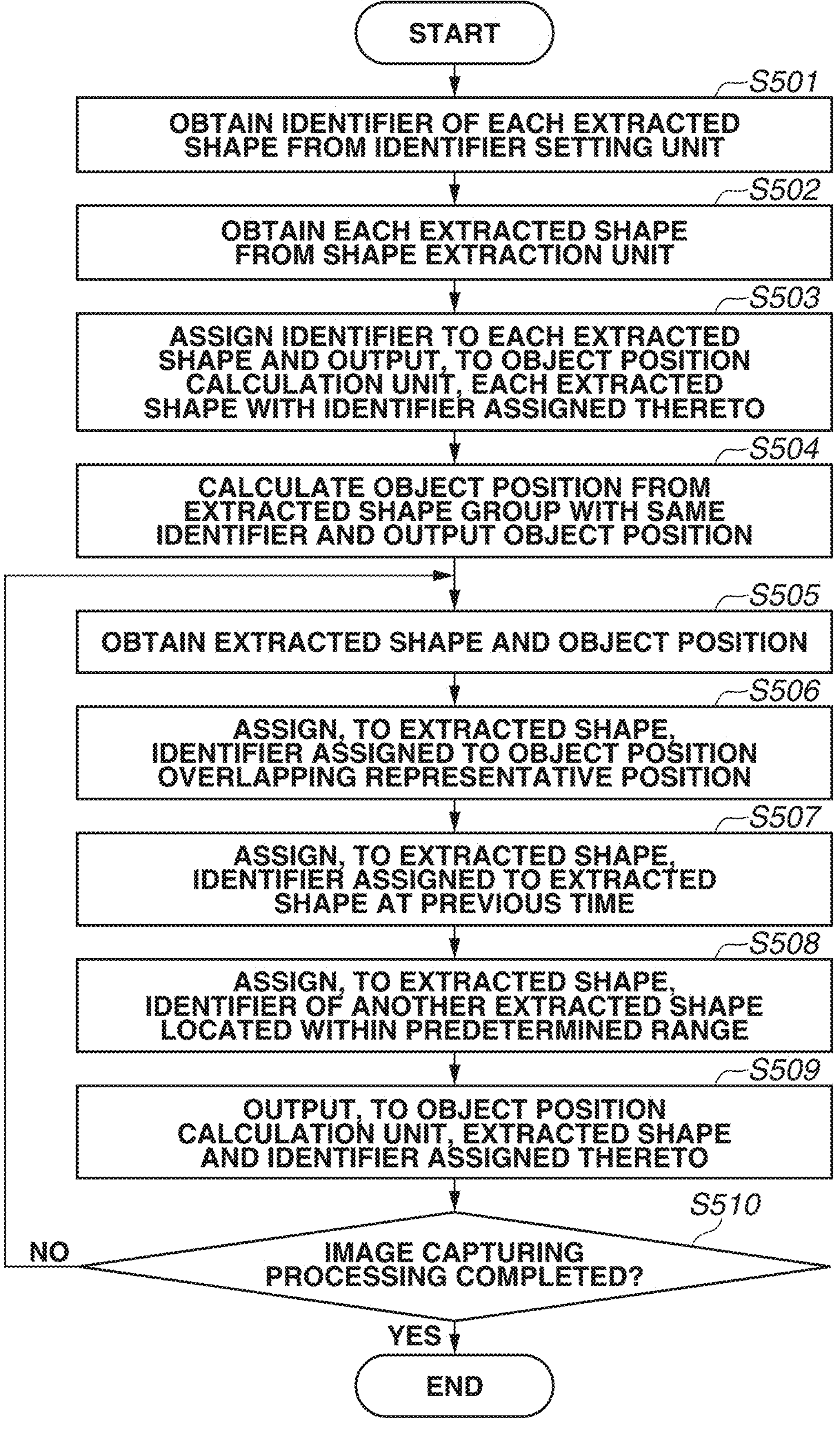
FIG. 5 is a flowchart illustrating an example of tracking analysis processing by a tracking unit.

Next, an example of tracking analysis processing on the position of each extracted shape by the tracking unit 12 will be described with reference to a flowchart illustrated in FIG. 5.

In step S501, the tracking unit 12 receives an input from the identifier setting unit 14 and performs initialization processing. More specifically, the tracking unit 12 obtains the identifier of each extracted shape input from the identifier setting unit 14.

In step S502, the tracking unit 12 obtains each extracted shape input from the shape extraction unit 11.

In step S503, the tracking unit 12 respectively assigns, to the obtained extracted shapes, the identifiers obtained from the identifier setting unit 14 and outputs, to the object position calculation unit 13, the extracted shapes with the identifiers assigned thereto.

In step S504, the object position calculation unit 13 calculates an object position from each extracted shape group with the same identifier assigned thereto, and outputs the calculated object position to the tracking unit 12.

The processing performed in steps S501 to S504 corresponds to the initialization processing.

Processing performed in steps S505 to S509 is performed at each time and repeated while the image capturing units 1 are capturing object images. When the image capturing units 1 end the image capturing processing (YES in step S510), the processing of this flowchart is ended upon completion of the processing in step S509.

In step S505, the tracking unit 12 obtains the extracted shapes input from the shape extraction unit 11 and the object positions at the immediately preceding time (the previous time) calculated by the object position calculation unit 13. The immediately preceding time indicates, for example, the image capturing time of the extracted shapes generated from the frame immediately preceding the frame corresponding to the extracted shapes currently being processed. In the present exemplary embodiment, for the sake of comparison, the time corresponding to the extracted shapes currently being processed is also referred to as the current time. In this case, the current time indicates the capturing time of the image used to generate the extracted shapes currently being processed.

In step S506, in a case where the representative position of each extracted shape at the current time overlaps an object position at the previous time, the tracking unit 12 assigns, to the extracted shape, the identifier assigned to the object position overlapping the representative position. In this step, in a case where the representative position of one extracted shape overlaps a plurality of object positions, the tracking unit 12 assigns, to the extracted shape, an identifier indicating "undeterminable" at the current time. In the processing of step S506, the identifier indicating "undeterminable" is assigned because a plurality of extracted shapes with different identifiers assigned thereto may overlap each other at the current time, like a state where two objects are close to each other. Processing in step S509 (described below) is performed on the extracted shapes to which the identifiers including the identifier indicating "undeterminable" are assigned.

In step S507, in a case where the position of the extracted shape to with an identifier has not yet been assigned overlaps the position of an extracted shape at the previous time, the tracking unit 12 assigns the identifier assigned to the extracted shape at the previous time, to the extracted shape at the current time.

In step S508, in a case where another extracted shape to which an identifier has already been assigned at the current time is within a predetermined range from the extracted shape to which an identifier has not yet been assigned, the tracking unit 12 assigns the identifier assigned to the other extracted shape, to the extracted shape to which an identifier has not yet been assigned. The predetermined range is desirably a range corresponding to the width between the feet of a standing object. For example, the predetermined range is a range with a radius of 50 cm from the center of the extracted shape. At this time, in a case where a plurality of other extracted shapes to which identifiers have already been assigned is within the predetermined range from a certain extracted shape, the tracking unit 12 assigns, to the certain extracted shape, the identifier of the extracted shape closest thereto among the other extracted shapes. The tracking unit 12 determines an extracted shape to which no identifier has been assigned at the time of completion of the processing up to step S508, as a non-tracking target. In this case, the tracking unit 12 does not output, to the object position calculation unit 13, the extracted shape determined as the non-tracking target.

In step S509, the tracking unit 12 outputs, to the object position calculation unit 13, the extracted shapes to which the identifiers are assigned in the processing in steps S506 to S508, and the identifiers assigned thereto.

In step S510, a control unit (not illustrated) determines whether the image capturing processing by the image capturing units 1 is completed. In a case where the control unit determines that the image capturing processing by the image capturing units 1 is not completed (NO in step S510), the processing returns to step S505 to repeat the processing in steps S505 to S509. In a case where the control unit determines that the image capturing processing by the image capturing units 1 is completed (YES in step S510), the processing in the flowchart ends.

Each processing in steps S506 to S508 is performed on each extracted shape. By repeating the processing in steps S506 to S509, the identifiers set by the identifier setting unit 14 are associated with the extracted shapes at each time. Using the associated identifiers, the object position calculation unit 13 can calculate the object positions for the respective objects in a distinguished manner.

In a case where the tracking unit 12 assigns the identifier indicating "undeterminable" to an extracted shape, some of the initial identifiers may not be assigned at a certain time. In such a case, the object position calculation unit 13 does not update the object position information corresponding to the same identifier as the identifier that has not been assigned to an extracted shape. In this way, even in a case where extracted shapes overlap because, for example, a plurality of objects comes closer, a plurality of pieces of object position information does not indicate the same position. In this case, a plurality of respective object positions at the previous time is maintained. Then, in a case where the overlapping plurality of extracted shapes has separated again because the objects have separated from each other, identifiers are assigned to the respective extracted shapes based on the latest object positions. In other words, when the overlap of the plurality of extracted shapes is resolved, the update of the respective pieces of object position information resumes.

Through the above-described processing, even in a case where a plurality of objects is present in an image capturing region, the image processing system can track each of the objects and obtain position information about of each of the objects. Further, through the above-described processing, the image processing system can easily track each of the objects even in a case where overlap and separation occur between generated three-dimensional shape models because, for example, the objects come close and separate. In this way, even in a case where, for example, a plurality of artists changes their positions while singing or comes close to hold their hands, the image processing system can generate a virtual viewpoint image with stereoscopic sounds as if the sounds are output from the respective mouths of the objects. By watching such a virtual viewpoint image, the user can enjoy a more realistic image and sound experience.

In the first exemplary embodiment, a specific example of the image processing system has been described, but exemplary embodiments of the present invention are not limited thereto.

For example, in the first exemplary embodiment, the shape extraction unit 11 is configured to receive the shape estimation result by the three-dimensional shape estimation unit 3 from the three-dimensional shape estimation unit 3, but the shape extraction unit 11 is not limited thereto. For example, the shape extraction unit 11 may obtain the shape estimation result by the three-dimensional shape estimation unit 3 from among the shape estimation results accumulated by the three-dimensional shape estimation unit 3 in the accumulation unit 4.

In the first exemplary embodiment, the predetermined height from the bottom surface of the circumscribed cuboid of each three-dimensional shape, based on which the shape extraction unit 11 clips a part of the three-dimensional shape, is 50 cm, but the predetermined height may not necessarily be 50 cm.

For example, the predetermined height may be set in a range from 20 cm to 100 cm. Alternatively, the predetermined height may be automatically set to a height between the knees and waist of each object based on the height of the object.

In the first exemplary embodiment, the shape extraction unit 11 clips a part of each three-dimensional shape corresponding to the predetermined height from the bottom surface of the circumscribed cuboid of the three-dimensional shape, but the clipping method is not limited thereto. The shape extraction unit 11 may uniformly clip parts of the three-dimensional shapes corresponding to a predetermined height from the floor surface in the image capturing region. In this case, if an object is on a structure, such as a stepstool, in the image capturing region, the shape extraction unit 11 may extract the object shape corresponding to a predetermined height from a top surface of the structure.

In the first exemplary embodiment, the shape extraction unit 11 projects the clipped parts of the three-dimensional shapes onto the two-dimensional plane to divide the clipped parts into independent shapes, but the shape extraction unit 11 is not limited thereto. For example, the shape extraction unit 11 may directly divide the clipped parts of the three-dimensional shapes after determining whether the clipped parts are independent from each other.

In this case, in the subsequent processing, the tracking unit 12 tracks each object based on the three-dimensional shape of the object.

As an example of the distance in which the identifier setting unit 14 according to the first exemplary embodiment assigns the same identifier to a plurality of extracted shapes, a distance (of 50 cm) corresponding to the width between the feet of a standing object is described to be desirable, but the distance is not necessarily limited thereto. For example, in a case where an object narrows the width between the feet because, for example, there are many objects and the distances therebetween are short, the distance in which the same identifier is assigned to a plurality of extracted shapes may be set to a short distance, such as 30 cm. On the other hand, in a case where an object can widen the width between the feet, such as a case where the image capturing region is wide, the distance in which the same identifier is assigned to a plurality of extracted shapes may be set to a long distance, such as 100 cm.

Figure 6A:
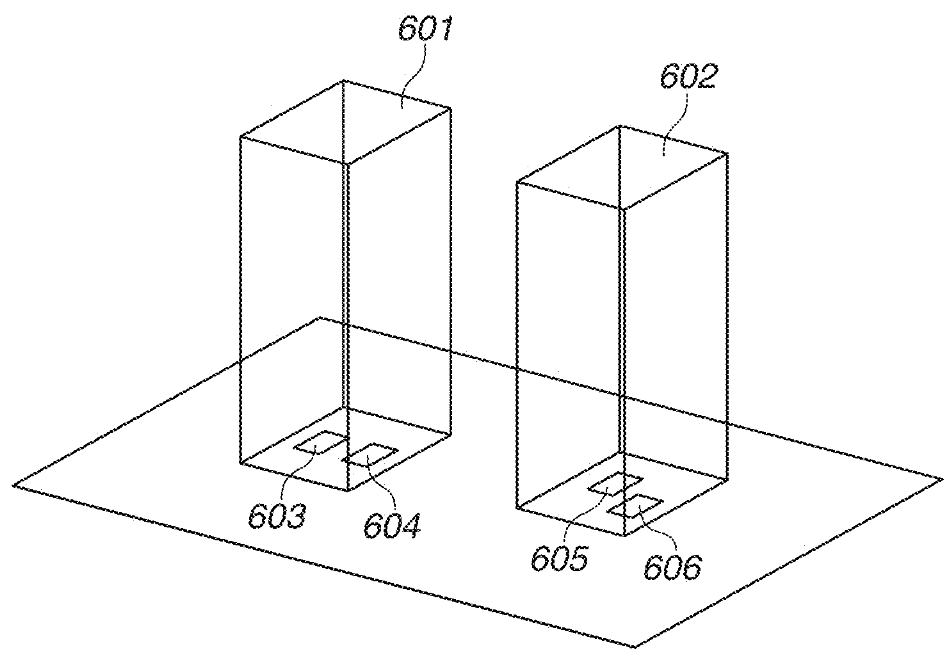
FIGS. 6A and 6B are diagrams each illustrating an example of a method for assigning the identifiers to the extracted shapes.
Figure 6B:
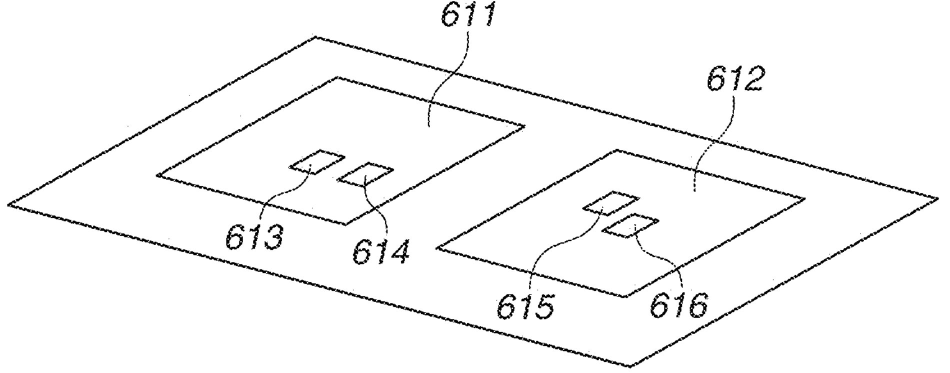

In the first exemplary embodiment, the identifier setting unit 14 is configured to assign identifiers to the extracted shapes based on the distances between the extracted shapes, but the identifier setting unit 14 is not necessarily limited thereto. For example, the identifier setting unit 14 may determine in which of the circumscribed cuboids of the three-dimensional shapes each extracted shape is included, and assign an identifier to the extracted shape. For example, in an example illustrated in FIG. 6A, the identifier setting unit 14 assigns an identifier "A" to extracted shapes 603 and 604 included in a circumscribed cuboid 601, and assigns an identifier "B" to extracted shapes 605 and 606 included in a circumscribed cuboid 602. Alternatively, the user may predetermine an area to which a predetermined identifier is to be assigned by the identifier setting unit 14. For example, as illustrated in FIG. 6B, first, the user inputs information about a determination area 611 with the identifier "A" assigned thereto, and information about a determination area 612 with the identifier "B" assigned thereto, to the image processing system via an input unit (not illustrated). Then, the identifier setting unit 14 assigns the identifier "A" to extracted shapes 613 and 614 included in the determination area 611, and the identifier "B" to extracted shapes 615 and 616 included in the determination area 612.

Figure 7A:
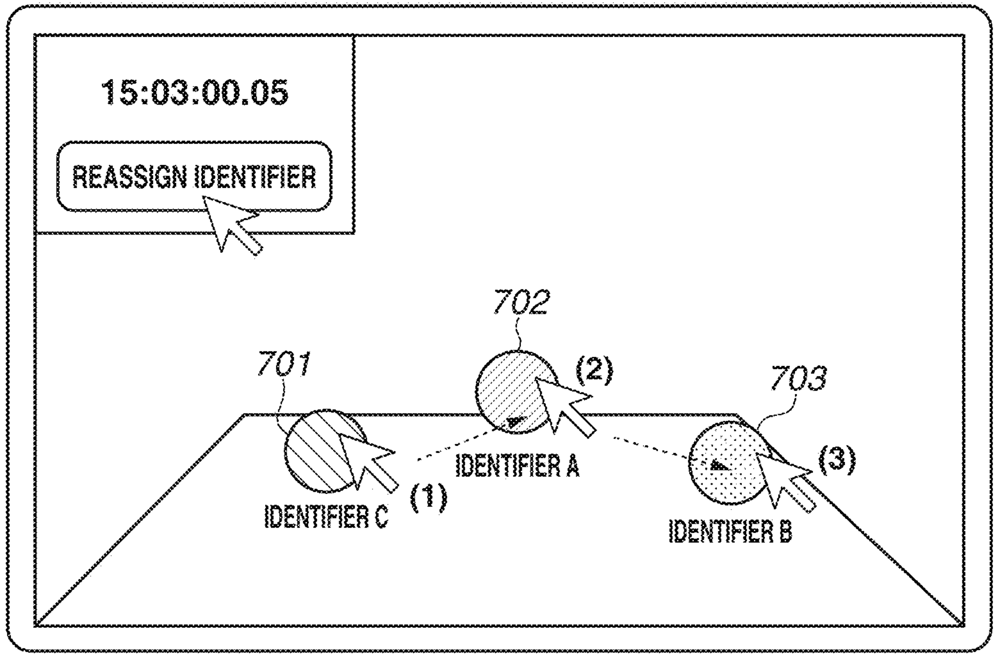
FIGS. 7A and 7B are diagrams illustrating reassignment of the identifiers via the GUI.
Figure 7B:
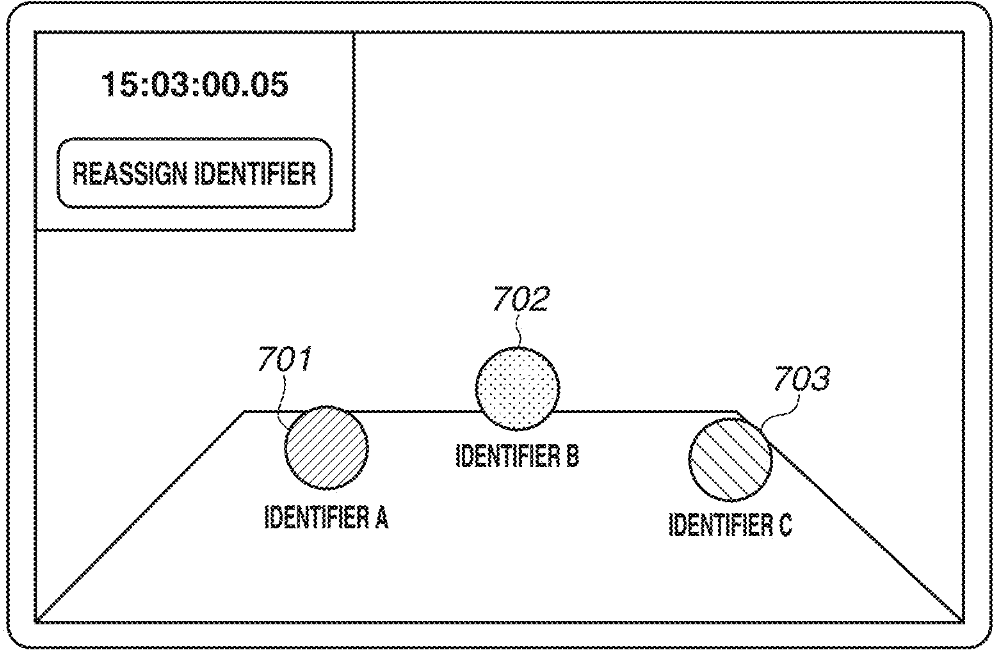

In the first exemplary embodiment, the identifier setting unit 14 automatically sets and assigns an identifier to each extracted shape, but the assignment method is not necessarily limited thereto. The user may determine the identifier to be assigned to each extracted shape. For example, a case will now be described where a plurality of objects is present and the user reassigns an identifier to each of the objects after the assignment of an identifier to each of the objects. In this case, for example, the user issues an instruction to shift to an identifier reassignment mode via a GUI illustrated in FIG. 7A. The user then designates identifiers to be assigned to the objects by sequentially clicking object positions 701 to 703 displayed on a screen illustrated in FIG. 7A. For example, suppose that an identifier "C" is assigned to the object position 701, the identifier "A" to the object position 702, and the identifier "B" to the object position 703. In a case where the user desires to assign the identifiers "A", "B", and "C" to the object positions 701, 702, and 703, respectively, in this order, the user clicks the object positions 701 to 703 in this order. The identifier setting unit 14 receives the order of the clicked object positions 701 to 703 and reassigns the identifiers "A", "B", and "C" based on the received order as illustrated FIG. 7B. The identifier setting unit 14 then outputs the extracted shapes and the identifiers reassigned thereto, to the tracking unit 12.

Figure 8A:
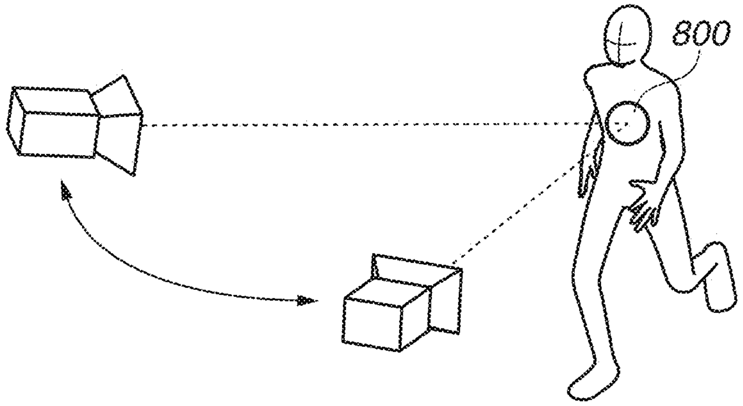
FIGS. 8A and 8B are diagrams each illustrating an example of how a viewpoint designation unit uses object position information.
Figure 8B:
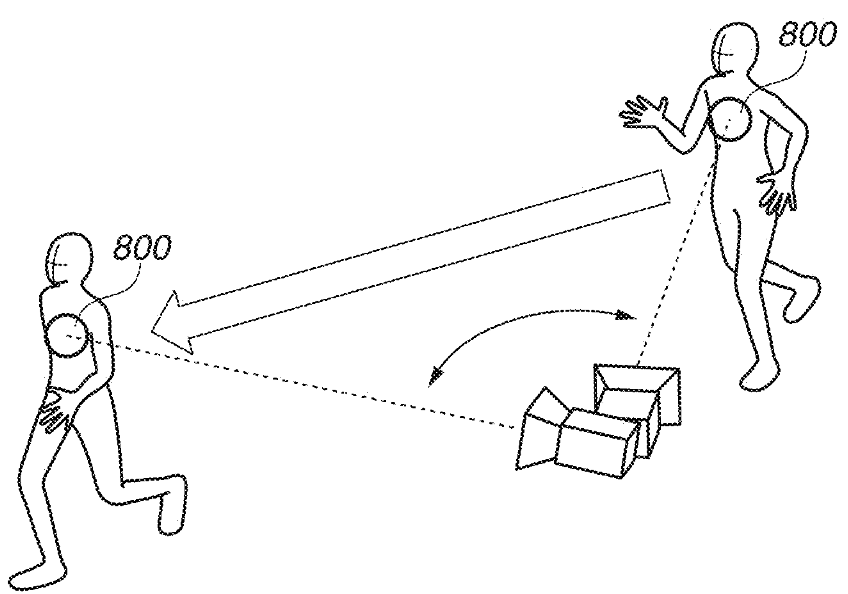

The configuration according to the first exemplary embodiment has been described in which the object position information about each object subjected to the tracking analysis is used as the sound source reproduction position, but the object position information is not necessarily limited thereto. For example, the viewpoint designation unit 5 may obtain and use the object position information accumulated in the accumulation unit 4. In this case, the viewpoint designation unit 5 may generate a virtual viewpoint capable of constantly revolving around an object even though the object moves, by setting, for example, a rotation center position of the virtual viewpoint to an object position 800 as illustrated in FIG. 8A. Alternatively, the viewpoint designation unit 5 may set, for example, a line-of-sight direction of the virtual viewpoint to the object position 800 as illustrated in FIG. 8B. In this case, the image processing system can generate a virtual viewpoint image based on the virtual viewpoint that is placed at a half-fixed position and automatically revolves in the horizontal direction accompanying with the movement of the object.

The processing units illustrated in FIG. 1 have been described to be hardware components in the above-described exemplary embodiments. In one embodiment, the processing performed by the processing units illustrated in FIG. 1 may be performed using a computer program.

Figure 9:
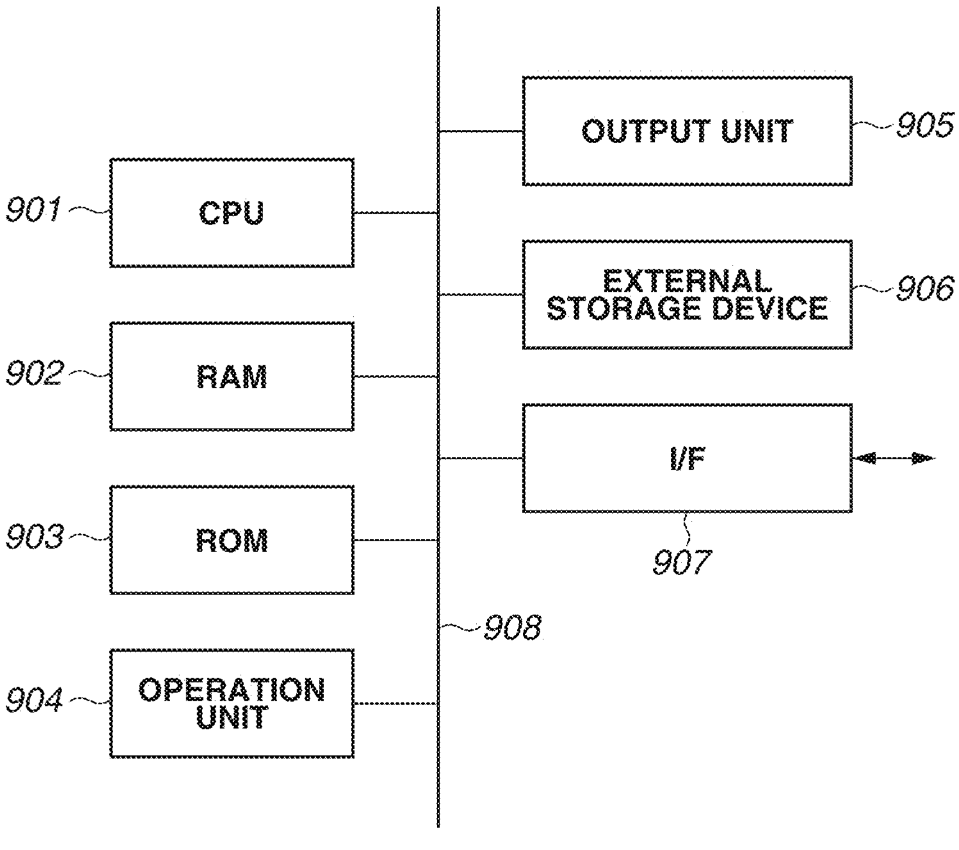
FIG. 9 is a block diagram illustrating an example of a computer hardware configuration.

FIG. 9 is a block diagram illustrating an example of a hardware configuration of a computer applicable to the image processing system according to the above-described exemplary embodiments.

A central processing unit (CPU) 901 controls the entire computer by using a computer program and data stored in a random access memory (RAM) 902 or a read-only memory (ROM) 903, and executes the above-described processing performed by the image processing system according to the above-described exemplary embodiments. In other words, the CPU 901 functions as the processing units illustrated in FIG. 1.

The RAM 902 includes an area for temporarily storing a computer program and data loaded from an external storage device 906, data obtained from an external apparatus via an interface (I/F) 907, and the like. The RAM 902 also includes a work area to be used when the CPU 901 executes various kinds of processing. For example, the RAM 902 can assign an area as a frame memory, or can provide various other areas as appropriate.

The ROM 903 stores setting data of the computer, a boot program, and the like. An operation unit 904 includes a keyboard and a mouse, and can input various kinds of instructions to the CPU 901 based on a user's operation. An output unit 905 displays a processing result of the CPU 901. The output unit 905 includes, for example, a liquid crystal display. For example, the operation unit 904 serves as the viewpoint designation unit 5, and the output unit 905 serves as the display unit 7.

The external storage device 906 is a large-capacity information storage device typified by a hard disk drive device. The external storage device 906 stores an operating system (OS) and a computer program for causing the CPU 901 to implement the functions of the processing units illustrated in FIG. 1. The external storage device 906 may further store pieces of image data serving as processing targets.

The computer program and data stored in the external storage device 906 are loaded into the RAM 902 as appropriate under the control of the CPU 901 and processed by the CPU 901. Networks, such as a local area network (LAN) and the Internet, and other devices, such as a projection device and a display device, can be connected to the I/F 907, and the computer can obtain and output various kinds of information via the I/F 907. In the first exemplary embodiment, the image capturing units 1 are connected to the I/F 907, the images captured by the image capturing units 1 are input via the I/F 907, and the image capturing units 1 are controlled via the I/F 907. A bus 908 connects the above-described components.

The CPU 901 centrally controls operations to be performed with the above-described configuration, in a similar manner to the operations described in the above-described exemplary embodiments.

In another configuration, the exemplary embodiments of the present invention can be implemented by supplying, to a system, a storage medium storing a code of a computer program for implementing the above-described functions, and causing the system to read and execute the code of the computer program. In this case, the code of the computer program read from the storage medium implements the functions according to the above-described exemplary embodiments, and the storage medium storing the code of the computer program is included in the exemplary embodiments of the present invention. Further, a configuration where the OS running on the computer executes part or all of the actual processing based on the instructions of the program code to implement the above-described functions is included in the exemplary embodiments of the present invention.

The exemplary embodiments may also be implemented with the following configuration. More specifically, a computer program code read from a storage medium is written into a memory provided in a function expansion card inserted in a computer, or a memory provided in a function expansion unit connected to the computer. Then, the above-described functions are implemented by a CPU, in the function expansion card or the function expansion unit, executing part or all of the actual processing based on the instructions of the computer program code. This configuration is also included in the exemplary embodiments of the present invention.

In a case where the exemplary embodiments of the present invention are applied to the above-described storage medium, the computer program code corresponding to the above-described processing is stored in the storage medium.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161719, filed Oct. 6, 2022, which is hereby incorporated by reference herein in its entirety.

What is claimed is:

1. An image processing apparatus comprising:

one or more memories storing instructions; and one or more processors executing the instructions to:

obtain three-dimensional shape data of at least one object, wherein the three-dimensional shape data is generated using images of the at least one object captured from a plurality of directions by a plurality of image capturing units; and assign identifiers to a plurality of parts of the obtained three-dimensional shape data corresponding to a predetermined height from a bottom surface of a circumscribe cuboid in the three-dimensional shape data based on positions of the plurality of parts.

2. The image processing apparatus according to claim 1, wherein the one or more processors extract the plurality of parts by clipping some of the three-dimensional shape data.

3. The image processing apparatus according to claim 1, wherein the one or more processors extract the plurality of parts corresponding to feet in the three-dimensional shape data.

4. The image processing apparatus according to claim 1, the one or more processors further execute the instructions to;

track the obtained three-dimensional shape data based on the identifiers and the positions of the plurality of parts; and calculate a representative position of parts, among the plurality of parts, to which the same identifier is assigned based on a result of the tracking, and output the representative position as an object position.

5. The image processing apparatus according to claim 1, wherein the one or more processors assign an identifier to each of the plurality of parts based on a distance between the plurality of parts of the three-dimensional shape data.

6. The image processing apparatus according to claim 1, wherein the one or more processors determine in which circumscribed cuboid in the three-dimensional shape data each of the plurality of parts is included, and assign the same identifier to parts included in the same circumscribed cuboid among the plurality of parts.

7. The image processing apparatus according to claim 1, wherein the one or more processors set a region in which a predetermined identifier is to be assigned, and assign the predetermined identifier to parts included in the region among the plurality of parts.

8. The image processing apparatus according to claim 1, wherein, based on a user's instruction, the one or more processors reassign the identifiers to the plurality of parts to which the identifiers have been assigned.

9. The image processing apparatus according to claim 1, wherein the one or more processors project the plurality of parts onto a two-dimensional plane corresponding to a floor surface to generate a two-dimensional image, clip the plurality of parts as independent regions on the two-dimensional image, and output respective circumscribed rectangles of the independent regions on the two-dimensional image.

10. The image processing apparatus according to claim 4, wherein the one or more processors further obtain a virtual viewpoint, and wherein the one or more processors generate a virtual viewpoint image based on the virtual viewpoint, the three-dimensional shape data, and a result of the tracking.

11. The image processing apparatus according to claim 4, wherein, based on the identifiers and the object position at a time immediately preceding an image capturing time of the plurality of parts, the one or more processors assign the identifiers to the plurality of parts.

12. The image processing apparatus according to claim 11, wherein, based on the identifiers and the positions of the plurality of parts at the immediately preceding time, the one or more processors assign the identifiers to the plurality of parts.

13. The image processing apparatus according to claim 12, wherein, among the plurality of parts, the one or more processors assign, to a part at a position overlapping the object position at the immediately preceding time, the identifier corresponding to the object position, and then determine whether a position of a part to which no identifier has yet been assigned overlaps one of the positions of the plurality of parts at the immediately preceding time, wherein, in a case where the position of the part overlaps one of the positions of the plurality of parts at the immediately preceding time, the one or more processors assign, to the part, the identifier of the corresponding part at the immediately preceding time, and wherein, in a case where the position of the part does not overlap any of the positions of the plurality of parts at the immediately preceding time, the one or more processors assign, to the part, the identifier of a part closest to the part in a predetermined range among the plurality of parts.

14. The image processing apparatus according to claim 13, wherein, in a case where, among the plurality of parts, there is a part at a position overlapping a plurality of the object positions at the immediately preceding time, the one or more processors assign no identifier to the part, and do not update position information about all the plurality of object positions.

15. A method for controlling an image processing apparatus, the method comprising:

obtaining three-dimensional shape data of at least one object, wherein the three-dimensional shape data is generated using images of the at least one object captured from a plurality of directions by a plurality of image capturing units; and assigning identifiers to a plurality of parts of the obtained three-dimensional shape data corresponding to a predetermined height from a bottom surface of a circumscribe cuboid in the three-dimensional shape data based on positions of the plurality of parts.

16. A non-transitory computer-readable storage medium storing a program for causing a computer to perform a method for controlling an image processing apparatus, the method comprising:

obtaining three-dimensional shape data of at least one object, wherein the three-dimensional shape data is generated using images of the at least one object captured from a plurality of directions by a plurality of image capturing units; and assigning identifiers to a plurality of parts of the obtained three-dimensional shape data corresponding to a predetermined height from a bottom surface of a circumscribe cuboid in the three-dimensional shape data based on positions of the plurality of parts.

* * * * *